United States Patent [19]

Smith et al.

[11] Patent Number: 5,696,197

[45] Date of Patent: Dec. 9, 1997

[54] HETEROGENEOUS SILICA CARBON BLACK-FILLED RUBBER COMPOUND

[75] Inventors: Richard Robinson Smith, Cuyahoga Falls; Kevin James Pyle, Uniontown; William Paul Francik, Bath; Paul Harry Sandstrom, Tallmadge, all of Ohio

[73] Assignee: The Goodyear Tire & Rubber Company, Akron, Ohio

[21] Appl. No.: 667,564

[22] Filed: Jun. 21, 1996

[51] Int. Cl.$^6$ .................. C08K 3/04; C08L 7/00
[52] U.S. Cl. ............ 524/495; 152/209 R; 524/573; 524/575; 524/575.5
[58] Field of Search .................. 524/495, 493, 524/496, 565, 573–575.5; 152/209 R

[56] References Cited

U.S. PATENT DOCUMENTS

| | | | |
|---|---|---|---|
| 3,873,489 | 3/1975 | Thurn et al. | 260/33.6 |
| 4,786,677 | 11/1988 | Nakai et al. | 524/496 |
| 5,066,721 | 11/1991 | Hamada et al. | 525/102 |
| 5,132,357 | 7/1992 | Endter et al. | 524/496 |
| 5,336,730 | 8/1994 | Sandstrom et al. | 524/493 |
| 5,430,087 | 7/1995 | Carlson et al. | 524/496 |
| 5,447,971 | 9/1995 | Bergh et al. | 524/496 |
| 5,494,955 | 2/1996 | Swor et al. | 524/496 |
| 5,534,578 | 7/1996 | Wideman et al. | 524/493 |

OTHER PUBLICATIONS

Lee, B L, "Controlled Ingredient–Distribution Mixing: Effect on Some Properties of Elastomer Blend Compounds," American Chemical Society (1984), 12, p. 186.

Sircar, A K, et al, "Carbon Black Transfer in Blends of Cis–Poly(Butadiene) with Other Elastomers," RC&T (1973), 46, pp. 178 and 190.

Lee, B L, "Experimental Studies of the Relationship of Processing to the Crack Growth of Carbon–Black–Loaded SBR—cis–Polybutadiene Compounds," Journal of Applied Polymer Science, vol. 27, pp. 3379–3392 (1982).

Primary Examiner—Melvyn I. Marquis
Assistant Examiner—D. Aylward
Attorney, Agent, or Firm—Bruce J. Hendricks

[57] ABSTRACT

The present invention relates to a heterogeneous silica/carbon black-filled rubber compound and a process for making the same. The rubber compound is characterized by containing silica, two different carbon blacks and two different rubbers. One of the carbon blacks is selectively dispersed in one rubber along with the silica and the other carbon black is dispersed in another rubber. The two rubber compounds are then mixed to form a heterogeneous rubber compound.

44 Claims, No Drawings

HETEROGENEOUS SILICA CARBON BLACK-FILLED RUBBER COMPOUND

BACKGROUND OF THE INVENTION

EP 0 501 227 A discloses methods for the manufacture of silica-based tread compounds. This reference identifies mixing procedures and materials when used improve rolling resistance and wet traction. Unfortunately, such procedures and materials substantially increase the cost of such tires. In order to further justify such costs, further improvement in the properties must be achieved to support the cost increases. Similarly, it is desirable to obtain the improvements disclosed in EP 0 501 227 A but at a lower cost.

SUMMARY OF THE INVENTION

The present invention relates to heterogeneous silica/carbon black-filled rubber compounds and a process for making such compounds.

DETAILED DESCRIPTION OF THE INVENTION

There is disclosed a process for the production of a heterogeneous silica/carbon black-filled rubber compound comprising (a) intimately dispersing substantially all of the silica filler and a first carbon black in a first rubber to form a silica/first carbon black-filled compound;

(b) separately and intimately dispersing a second carbon black in a second rubber to form a second carbon black-filled compound; and (c) mixing said silica/first carbon black-filled compound with said second carbon black-filled compound to form a heterogeneous silica/carbon black-filled rubber compound, wherein said first carbon black and second carbon black are different from each other and one of said first carbon black or second carbon black has a DBP absorption value in a range of from about 90 to about 160 cc/100 gm and a corresponding Iodine Number in a range of from about 90 to about 150 g/kg and the other first or second carbon black has a DBP absorption value in a range of from about 60 to about 160 cc/100 gm with a corresponding Iodine Absorption Number in a range of about 25 to about 85 g/kg; and wherein said first rubber and second are different from each other and one of said first rubber or second rubber is cis 1,4-polyisoprene and the other first or second rubber is selected from the group consisting of emulsion polymerized styrene/butadiene copolymers, solution polymerized styrene/butadiene copolymers, cis 1,4-polybutadiene, styrene/isoprene copolymers, 3,4-polyisoprene, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and mixtures thereof.

There is also disclosed a heterogenous silica/carbon black-filled rubber compound comprising (a) intimately dispersing substantially all of the silica filler and a first carbon black in a first rubber to form a silica/first carbon black-filled compound;

(b) separately intimately dispersing a second carbon black in a second rubber to form a second carbon black-filled compound; and (c) mixing said silica/first carbon black-filled compound with said second carbon black-filled compound to form a heterogeneous silica/carbon black-filled rubber compound, wherein said first carbon black and second carbon black are different from each other and one of said first carbon black or second carbon black has a DBP absorption value in a range of from about 90 to about 160 cc/100 gm and a corresponding Iodine Number in a range of from about 90 to about 150 g/kg and the other first or second carbon black has a DBP absorption value in a range of from about 60 to about 160 cc/100 gm with a corresponding Iodine Absorption Number in a range of about 25 to about 85 g/kg; and wherein said first rubber and second are different from each other and one of said first rubber or second rubber is cis 1,4-polyisoprene and the other first or second rubber is selected from the group consisting of emulsion polymerized styrene/butadiene copolymers, solution polymerized styrene/butadiene copolymers, cis 1,4-polybutadiene, styrene/isoprene copolymers, 3,4-polyisoprene, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and mixtures thereof.

The present invention relates to heterogeneous silica/carbon black-filled rubber compounds. Heterogeneous as used herein means containing dissimilar ingredients or constituents. More specifically, the term means a rubber compound containing the selective dispersion of substantially all of the silica along with a first carbon black in a first rubber and a second carbon black in a second rubber. One of the first or second rubbers is always cis 1,4-polyisoprene. The cis 1,4-polyisoprene may be natural rubber, synthetic cis 1,4-polyisoprene or mixtures of the two. Upon subsequent mixing of the two rubber compounds, there is a higher concentration of the silica and first carbon black in one phase (the first rubber) and a higher concentration of the second carbon black in another phase (the second rubber).

One critical aspect of the present invention is that the first rubber and second rubber are different. Even though the two rubbers are different, one of the rubbers is always cis 1,4-polyisoprene and the other rubber is selected from the group consisting of emulsion polymerized styrene/butadiene copolymers, solution polymerized styrene/butadiene copolymers, cis 1,4-polybutadiene, styrene/isoprene copolymers, 3,4-polyisoprene, isoprene/butadiene copolymers, medium vinyl polybutadiene (20 percent to 60 percent by weight of vinyl units), styrene/isoprene/butadiene terpolymers, butyl rubber, polychloroprene, acrylonitrile/butadiene copolymers and ethylene/propylene/diene terpolymers and mixtures thereof. The first rubber or the second rubber may be the cis 1,4-polyisoprene. Correspondingly, the first or second rubber may be selected from the above-identified group. The key is the first and second rubbers must be different. Preferably, the first rubber is solution polymerized styrene/butadiene copolymers, isoprene/butadiene copolymers, cis 1,4-polybutadiene and mixtures thereof. Preferably, the second rubber is natural rubber. In an alternate embodiment, it is preferred that the first rubber is natural rubber and the second rubber is selected from the group consisting of solution polymerized styrene/butadiene copolymers, isoprene/butadiene copolymers, cis 1,4-polybutadiene and mixtures thereof.

The first rubber compound, that is which contains substantially all of the silica and its first carbon black, comprises from 20 to 80 parts by weight per 100 parts by weight of total rubber (phr) in the heterogeneous silica/carbon black-filled rubber compound. Preferably, the first rubber comprises from 50 to 70 phr in the heterogeneous silica/carbon black-filled rubber compound.

The second rubber compound, that is which contains the second carbon black, comprises from 20 to 80 phr of the total rubber in the heterogeneous silica/carbon black-filled rubber compound. Preferably, the second comprises from 30 to 50 phr in the heterogeneous silica/carbon black-filled rubber compound.

In addition to the first and second rubber, additional rubbers may be used so long as such additional rubbers are different from the first and second rubbers. For example, a third or fourth rubber from the above list may be used. Such additional rubbers may be used in a total amount ranging from 10 to 40 phr. If used, the additional rubber(s) are preferably used in an amount ranging from 15 to 35 phr. Examples of a preferred third rubber include cis 1,4-polybutadiene, emulsion polymerized styrene butadiene rubber and 3,4-polyisoprene.

An essential aspect of the present invention is the use of a mixture of two different carbon blacks. One of the carbon black that is used has a DBP absorption value in a range of about 60 to about 160 cc/100 gm with a corresponding Iodine Absorption Number in a range of about 25 to about 85 g/kg. Preferably, this carbon black has a DBP absorption value in a range of about 100 to about 140 cc/100 gm with a corresponding Iodine Number in a range of about 45 to about 70 m$^2$/g. Representative carbon blacks that fall within the above ranges include N326, N330, M332, N351, N358, N539, N550, N630, N642, N650, N660, N683, N762, N765, N774 and N787. The preferred carbon black is N351.

The other carbon black that is used is a high reinforcing carbon black. This carbon black has a DBP absorption value in a range of about 90 to about 160 cc/100 gm and a corresponding Iodine Number in a range of about 90 to about 150 g/kg. Preferably, the second carbon black has a DBP absorption value in a range of about 100 to about 140 cc/100 gm with a corresponding Iodine Number in a range of about 100 to about 140 m$^2$/g. Representative carbon blacks that fall within the above ranges include N110, N121, N220, N231, N234, N242, N293, N299, N339, N343, N347 and N375.

The weight ratio of the one carbon black (low reinforcing) to the other carbon black (high reinforcing) may vary. Generally speaking, the weight ratio of the low reinforcing carbon black to the high reinforcing carbon black will range from about 3:1 to 1:3. Preferably, the weight ratio will range from 1.5:1 to 1:1.5.

The total weight of the low reinforcing carbon black and high reinforcing carbon black combined ranges from to as low as 3 phr to an upper limit of 120 phr. Preferably, the total amount of the two carbon blacks combined ranges from 30 to 100 phr.

The total weight of low reinforcing carbon black that is present in the heterogeneous silica/carbon black-filled compound may range from 1 to 90 phr. Preferably, the low reinforcing carbon black is present in an amount ranging from 15 to 45 phr.

The total weight of high reinforcing carbon black that is present may range from 1 to 90 phr. Preferably, the high reinforcing carbon black is present in an amount ranging from 15 to 45 phr.

As mentioned above, the total amount of carbon black that is present is limited and, therefore, the upper limits of both the low and high reinforcing carbon blacks cannot be used since it would result in an amount in excess of 120 phr. Similarly, the lower limits of both the low and high reinforcing carbon blacks cannot be used since it would result in an amount below 3 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The Rhone-Poulenc Z1165MP silica is currently preferred.

The total amount (phr) of silica, first carbon black and second carbon black that is added to the heterogeneous silica carbon black-filled rubber compound ranges from 8 phr to 160 phr. Preferably, the total of the three fillers range from 45 phr to 150 phr. The weight ratio of total carbon black (first and second carbon black combined) to silica ranges from 3:1 to 1:3. Preferably, the weight ratio is from 1:2 to 2:1. Accordingly, silica may be added to the heterogeneous silica/carbon black-filled rubber compound in an amount ranging from 5 to 120 phr. Preferably, from 15 to 50 phr of the silica is added. Substantially all of the silica is added to the first rubber compound. Substantially is intended to mean at least 85 weight percent of the total amount of silica used in the compound. Preferably, the total amount of silica is added to the first rubber.

The silica is intimately dispersed in the first rubber along with the first carbon black to form a silica-filled compound. Generally speaking, a silica coupler is added at this stage. The mixing may be accomplished by methods known to those skilled in the rubber mixing art. For example, fixed and variable speed mixers or Banburys™ may be used. The first rubber, first carbon black and silica are mixed in a nonproductive mix stage. The final curatives including sulfur-vulcanizing agents are typically mixed in the final stage which is conventionally called the "productive" mix stage in which mixing typically occurs at a temperature, or ultimate temperature lower than the mix temperature(s) of the preceding nonproductive stage(s) and always below the subsequent cure temperatures. The silica, first carbon black, silica coupler and first rubber are preferably mixed for a time and temperature to intimately disperse the silica. For example, mixing at a rubber temperature from 130° to 180° C. for a period of from 10 seconds to 20 minutes.

The first carbon black may be the low reinforcing carbon black or high reinforcing carbon black so long as the other carbon black is used. For example, if the low reinforcing carbon black is used with the first rubber, the high reinforcing carbon black is used with the second rubber. Similarly, if the high reinforcing carbon black is used with the first rubber, the low reinforcing carbon black is used with the second rubber.

In addition to the first rubber, first carbon black and silica, a silica coupling agent may be present to promote the interaction of the silica and first rubber. Various known silica couplers may be used.

One example of a silica coupler is a sulfur-containing organosilicon compound. Examples of sulfur-containing organosilicon compounds are of the formula:

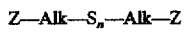

in which Z is selected from the group consisting of

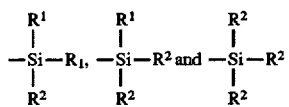

where
R$^1$ is an alkyl group of 1 to 4 carbon atoms, cyclohexyl or phenyl;
R$^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethylmethoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5,-bis(dimethoxymethylsilylpentyl) trisulfide, 3,3,-bis(trimethoxysilyl-2-methylpropyl) tetrasulfide, 3,3'-bis(dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl) tetrasulfide. Therefore, as to the above formula, preferably Z is

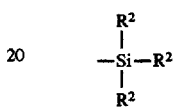

where R$^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur-containing organosilicon compound in a rubber composition will vary depending on the level of silica that is used. Generally speaking, the amount of the compound will range from 0.5 to 50 phr. Preferably, the amount will range from 1.5 to 8 phr. Depending on the desired properties, the weight ratio of the sulfur-containing organosilicon compound to silica may vary. Generally speaking, the weight ratio will range from 1:100 to 1:5. Preferably, the weight ratio will range from 1:20 to 1:10.

In the second critical step of the present invention, the second carbon black is separately and intimately dispersed in the second rubber, to form a second carbon black-filled compound.

As indicated above, the high reinforcing carbon black and low reinforcing carbon black are selectively mixed in first or second rubber. The only exception to this applies to those rubber chemicals, such as sulfur-containing organosilicons, which are dispersed on carbon black. Since the amount of carbon black used as a carrier is so low, such levels are not believed to be determined irrespective of the type of carbon black that is used as the carrier.

It can be readily understood by those having skill in the art that the second carbon black rubber composition may be compounded by methods generally known in the rubber compounding art in equipment such as mills, Banburys and the like.

Both the silica/first carbon black-filled compound and second carbon black-filled compound may contain various commonly used additive materials such as, for example, processing additives such as oils, resins including tackifying resins and plasticizers, pigments, fatty acid, zinc oxide, waxes, antioxidants and antiozonants and peptizing agents. Depending on the intended use of the heterogeneous silica/carbon black-filled rubber compound, the additives mentioned above are selected and commonly used in conventional amounts. Typical amounts of tackifier resins, if used, comprise about 0.5 to about 10 phr, usually about 1 to about 5-phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc Oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The above additives may be mixed in the first carbon black silica-filled rubber compound or second carbon black rubber-filled compound in any ratio.

The above conventional ingredients may also be added to subsequent mixes including the productive step.

Once the silica/first carbon black-filled first rubber compound has been prepared as well as the second carbon black-filled compound, the two rubber compounds are combined. This may be done as a nonproductive or productive blending step. Alternatively, either the first or second rubber compound can be processed in a separate productive step and subsequently combined with the other nonproductive compound. Preferably, the combination of the two are done at the productive step.

As described above, the productive step involves a mixing stage where the curatives are added. For example, sulfur donors or sulfur-vulcanizing agents include elemental sulfur (free sulfur), an amine disulfide, polymeric polysulfide and sulfur olefin additives. Preferably, the sulfur-vulcanizing agent is elemental sulfur. The sulfur-vulcanizing agent may be used in an amount ranging from 0.5 to 8 phr, with a range of from 0.5 to 4 being preferred. Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.5, phr. In another embodiment, combinations of a primary and a secondary accelerator might be used with the secondary accelerator being used in amounts of about 0.05 to about 5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Vulcanization of the rubber composition of the present invention is generally carried out at conventional temperatures ranging from 100° C. to 200° C. Preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur-vulcanizable composition, the rubber composition of this invention can be used for various purposes. For example, the sulfur-vulcanized rubber composition may be in the form of a pneumatic tire, belt, hose, air spring, shoe product and motor mount. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

The following tables report cure properties that were determined from the rubber stocks that were prepared. These properties include tensile modulus, tensile strength, hardness, rebound values and autovibron properties.

EXAMPLE 1

Tables 1 and 2 compare standard "all-in" mixed compounds versus phase-mixed compounds which are of the same formulations (30 phr silica and 15 phr N220 carbon black/15 phr N351 carbon black) using a 70/30 by weight rubber blend of natural rubber (NR)/emulsion polymerized SBR (ESBR). All of the ingredients in Control 1 were mixed in one nonproductive step. In Samples 1 and 2, two separate nonproductive steps were used. In each nonproductive mixing step, a Kobe™ BB-2 mixer was used. The nonproductive step of all compounds containing silica (Standard and Nonproductive A) utilized variable speed mixing.

For Control 1, the rubber was loaded and mixed at 60 RPM. After 30 seconds, all of the silica coupler and one-half of the silica filler were added. After 60 seconds, the remaining silica, carbon blacks and other additives were loaded. Once the rubber temperature reached 160° C., the rotor speed was adjusted to maintain 160° C. for 7 minutes. The nonproductive compound was then discharged.

For Nonproductive A in Samples 1 and 2, the above procedure was repeated except that only one carbon black was added.

For the Nonproductive B step in Samples 1 and 2, the mixing was at 55 rpm. The rubber, the second carbon black and the remaining additives were loaded. After 150 seconds, the rubber compound temperature was approximately 170° C., the mixing was stopped and its contents removed. For the Productive step for Control 1, one-half of the amount of the nonproductive mix was loaded along with the curatives followed by the remaining one-half of the nonproductive. Mixing was then commenced for approximately 2 minutes at 35 rpm. The rubber temperature reached approximately 90° to 100° C. and the load was discharged.

For the Productive step for Samples 1 and 2, half the Nonproductive A and Nonproductive B were loaded along with the curatives followed by the remaining halves of Nonproductives A and B. Mixing was then commenced for approximately 2 minutes at 35 rpm. The rubber temperature reached approximately 90° to 100° C. and the load was discharged.

The resulting rubber compositions were then vulcanized at a temperature of about 150° C. for about 20 minutes. The rubber compositions were comprised of the ingredients illustrated in Table 1.

TABLE 1

STANDARD vs PHASE-MIXED COMPOUNDS

| Sample | Control 1 | Sample 1 | Sample 2 |
|---|---|---|---|
| Mix Procedure | Standard | Phase | Phase |
| Component | NP | NP A | NP A |
| NR[1] | 70 | 70 | 70 |
| ESBR[2] | 30 | | |
| Silica[3] | 30 | 30 | 30 |
| Carbon Black (N220) | 15 | | 15 |
| Carbon Black (N351) | 15 | 15 | |
| Oil | 10 | 7 | 7 |
| Wax | 1.5 | 1.05 | 1.05 |
| Stearic Acid | 2.0 | 1.4 | 1.4 |
| Coupling Agent[4] | 5.5 | 5.5 | 5.5 |
| | | NP B | NP B |
| ESBR[2] | | 30 | 30 |
| Carbon Black (N220) | | 15 | |
| Carbon Black (N351) | | | 15 |
| Oil | | 3 | 3 |
| Wax | | 0.45 | 0.45 |
| Stearic Acid | | 0.60 | 0.60 |
| | Productive | Productive | Productive |
| Antioxidants[5] | 3.4 | 3.4 | 3.4 |
| Zinc Oxide | 3.5 | 3.5 | 3.5 |
| Sulfur | 1.3 | 1.3 | 1.3 |
| Accelerators 1 & 2[6] | 1.6 | 1.6 | 1.6 |

[1]Natural rubber (cis 1,4-polyisoprene), SMR-20.
[2]Emulsion polymerization prepared SBR having a bound styrene content of about 23 percent and obtainable as PLF 1502 from The Goodyear Tire & Rubber Company.
[3]ZEOPOL 8745 commercially available from Huber Company.
[4]A composition of bis-(3-triethoxysilylpropyl)tetrasulfide and N333 carbon black (50/50 weight ratio and, thus, considered as being 50 percent active) commercially available as X50S from Degussa.
[5]Of the paraphenylene diamine types.
[6]The accelerators were of the sulfenamide and thiuram disulfide types.

The physical properties for the resulting vulcanized rubber compositions are shown in the following Table 2.

The DIN abrasion test is sometimes referred to as "DIN 53516" and is indicative of rubber wear due to abrasion. The DIN abrasion test is well known to those skilled in such art. A higher value is indicative of a larger amount of rubber removed by abrasion and, thus, a greater amount of wear for the rubber sample.

All of the other tests including the tensile strength, elongation, 300 percent modulus, hot and cold rebound and hardness methods of rubber characterization are well known to those having skill in such art.

TABLE 2

| Sample | Control 1 | Sample 1 | Sample 2 |
|---|---|---|---|
| Mix Procedure | Standard Properties | Phase | Phase |
| Tensile Modulus, MPa | | | |
| 100% | 2.2 | 2.3 | 2.4 |
| 300% | 12.8 | 13.0 | 14.2 |
| Tensile Strength, MPa | 19.2 | 20.0 | 19.9 |
| Hardness, RT | 59 | 60 | 61 |
| 100° C. | 53 | 55 | |
| Rebound, RT | 50 | 51 | 52 |
| 100° C. | 66 | 67 | 67 |
| Autovibron Properties @ 11 Hz | | | |
| Tan Delta, 60° C. | 0.088 | 0.084 | 0.075 |

In each phase-mixed compound (Samples 1 and 2), modulus and hardness values were higher than the values for the Control (Control 1). Higher modulus and compound hardness values are believed to be predictive of increased tire traction and handling properties. Also, the rebound values (100° C. and room temperature values) of Samples 1 and 2 were higher than those of Control 1 whereas the Tangent delta values at 60° C. (11 Hz) of Samples 1 and 2 were lower than those of Control 1. Higher rebound values along with lower Tangent delta values at 60° C. indicate lower hysteresis for these phase-mixed rubber compositions and are predictive of decreased rolling resistance for a tire tread and, thus, higher vehicular fuel economy.

Thus, insofar as providing a tread with enhanced rebound and stiffness properties, the phase-mixed compounds (Samples 1 and 2) unexpectedly provided improved property behavior compared to the standard mixed control compound (Control 1) of the same overall composition.

EXAMPLE 2

Tables 3 and 4 compare standard mixed compounds versus phase-mixed compounds of the same formulation using a 70/30 by weight solution polymerized SBR (SSBR) /natural rubber (NR) elastomer blend. As in Example 1, these compounds all contained 30 phr silica, 15 phr N220 carbon black and 15 phr N351 carbon black. All of the ingredients in Control 2 were mixed using the same procedure as described in Example 1 for Control 1. Similarly, Samples 3 and 4 were prepared using the same procedures described in Example 1 for Samples 2 and 3. The rubber compositions were comprised of the ingredients illustrated in Table 3.

TABLE 3

STANDARD vs PHASE-MIXED COMPOUNDS

| Sample | Control 2 | Sample 3 | Sample 4 |
|---|---|---|---|
| Mix Procedure | Standard | Phase | Phase |
| Component | NP | NP A | NP A |
| SSBR[1] | 70 | 70 | 70 |
| NR[2] | 30 | | |
| Silica[3] | 30 | 30 | 30 |
| Carbon Black (N220) | 15 | | 15 |
| Carbon Black (N351) | 15 | 15 | |
| Oil | 10 | 7 | 7 |
| Wax | 1.5 | 1.05 | 1.05 |
| Stearic Acid | 2.0 | 1.4 | 1.4 |
| Coupling Agent[4] | 5.5 | 5.5 | 5.5 |

TABLE 3-continued

|  | NP B | NP B |
|---|---|---|
| NR | 30 | 30 |
| Carbon Black (N220) | 15 |  |
| Carbon Black (N351) |  | 15 |
| Oil | 3 | 3 |
| Wax | .45 | .45 |
| Stearic Acid | .60 | .60 |

|  | Productive | Productive | Productive |
|---|---|---|---|
| Antioxidants[5] | 3.4 | 3.4 | 3.4 |
| Zinc Oxide | 3.5 | 3.5 | 3.5 |
| Sulfur | 1.3 | 1.3 | 1.3 |
| Accelerators 1 & 2 | 1.6 | 1.6 | 1.6 |

[1] A solution polymerized stryene-butadiene copolymer having a styrene content of 23.5 percent by weight, 45 percent by weight vinyl-bond content and a Tg of - 39° C. This SSBR was acquired from The Firestone Tire & Rubber Co. under the designation Duradene ™ 715.
[2] Natural rubber (cis 1,4-polyisoprene), SMR-20
[3] Zeopol ™ 8745 commercially available from Huber Company
[4] 3,3'-bis(triethoxysilylpropyl)tetrasulfide on a carbon black carrier (50%—50% by weight) commercially available from Degussa under the commercial designation X50S.
[5] Of the paraphenylene diamine types.

The physical properties for the resulting vulcanized rubber compositions are shown in the following Table 4.

TABLE 4

| Sample | Control 2 | Sample 3 | Sample 4 |
|---|---|---|---|
| Mix Procedure | Standard Properties | Phase | Phase |
| Tensile Modulus, MPa |  |  |  |
| 100% | 2.3 | 2.5 | 2.4 |
| 300% | 12.8 | 14.6 | 13.7 |
| Tensile Strength, MPa | 15.5 | 16.4 | 16.7 |
| Hardness, RT | 59 | 60 | 60 |
| 100° C. | 53 | 55 | 54 |
| Rebound, RT | 45 | 44 | 44 |
| 100° C. | 62 | 64 | 63 |
| Autovibron Properties @ 11 Hz |  |  |  |
| Tan Delta, 60° C. | 0.107 | 0.104 | 0.105 |

In each phase-mixed compound (Samples 3 and 4), modulus and hardness values were higher than the values for the Control (Control 2) and predict increased tire traction and handling properties. Also, hot rebound (100° C.) values of Samples 3 and 4 were higher than those of Control 2, whereas the Tangent delta values at 60° C. of Samples 3 and 4 were lower than those of Control 2. Higher rebound values along with lower Tangent delta values at 60° C. indicate lower hysteresis properties for these phase-mixed rubber compounds and are predictive of lower rolling resistance for a tire tread.

EXAMPLE 3

Tables 5 and 6 compare standard mixed compounds versus phase-mixed compounds of the same formulation using a 70/30 by weight natural rubber (NR)/polybutadiene elastomer blend. As in Example 1, these compounds all contained 30 phr silica, 15 phr N220 carbon black and 15 phr N351 carbon black. All of the ingredients in Control 3 were mixed using the same procedure as described in Example 1 for Control 1. Similarly, Samples 5 and 6 were prepared using the same procedures described in Example 1 for Samples 1 and 2. The rubber compositions were comprised of the ingredients illustrated in Table 5.

TABLE 5

STANDARD vs PHASE-MIXED COMPOUNDS

| Sample | Control 3 | Sample 5 | Sample 6 |
|---|---|---|---|
| Mix Procedure | Standard | Phase | Phase |
| Component | NP | NP A | NP A |
| NR[1] | 70 | 70 | 70 |
| BR[2] | 30 |  |  |
| Silica[3] | 30 | 30 | 30 |
| Carbon Black (N220) | 15 |  | 15 |
| Carbon Black (N351) | 15 | 15 |  |
| Oil | 10 | 7 | 7 |
| Wax | 1.5 | 1.05 | 1.05 |
| Stearic Acid | 2.0 | 1.4 | 1.4 |
| Coupling Agent[4] | 5.5 | 5.5 | 5.5 |

|  | NP B | NP B |
|---|---|---|
| BR2 | 30 | 30 |
| Carbon Black (N220) | 15 |  |
| Carbon Black (N351) |  | 15 |
| Oil | 3 | 3 |
| Wax | .45 | .45 |
| Stearic Acid | .60 | .60 |

|  | Productive | Productive | Productive |
|---|---|---|---|
| Antioxidants[5] | 3.4 | 3.4 | 3.4 |
| Zinc Oxide | 3.5 | 3.5 | 3.5 |
| Sulfur | 1.3 | 1.3 | 1.3 |
| Accelerators 1 & 2[6] | 1.6 | 1.6 | 1.6 |

[1] Natural rubber (cis 1,4-polyisoprene), SMR-20.
[2] Polybutadiene rubber obtained from The Goodyear Tire & Rubber Company under the designation Budene 1207.
[3] Zeopol ™ 8745 commercially available from Huber Company.
[4] 3,3'-bis(triethoxysilylpropyl)tetrasulfide on a carbon black carrier (50%—50% by weight). Commercially available from Degussa under the commercial designation X50S.
[5] Of the paraphenylene diamine types.
[6] The accelerators were of the sulfenamide and thiuram disulfide type.

The physical properties for the resulting vulcanized rubber compositions are shown in the following Table 6.

TABLE 6

| Sample | Control 3 | Sample 5 | Sample 6 |
|---|---|---|---|
| Mix Procedure | Standard Properties | Phase | Phase |
| Tensile Modulus, MPa |  |  |  |
| 100% | 1.7 | 2.1 | 2.1 |
| 300% | 9.7 | 11.6 | 12.0 |
| Tensile Strength, MPa | 19.4 | 21.3 | 20.6 |
| Hardness, RT | 54 | 58 | 57 |
| Hardness, 100° C. | 50 | 55 | 55 |
| Rebound, RT | 54 | 54 | 56 |
| Hardness, 100° C. | 63 | 68 | 69 |
| Autovibron Properties @ 11 Hz |  |  |  |
| Tan Delta, 60° C. | 0.082 | 0.054 | 0.065 |

In each phase-mixed compound (Samples 5 and 6), modulus and hardness values were higher than the values for the Control (Control 3) and predict increased tire traction and handling properties. Also, hot rebound (100° C.) values of Samples 5 and 6 were higher than those of Control 3, whereas the Tangent delta values at 60° C. of Samples 5 and 6 were lower than those of Control 3. Higher rebound values along with lower Tangent delta values at 60° C. indicate lower hysteresis properties for these phase-mixed rubber compounds and are predictive of lower rolling resistance for a tire tread.

EXAMPLE 4

Controls

Tables 7 and 8 compare standard mixed compounds versus phase-mixed compounds of the same formulation using a 70/30 by weight emulsion SBR (ESBR)/polybutadiene elastomer blend. As in Example 1, these compounds all contained 30 phr silica, 15 phr N220 carbon black and 15 phr N351 carbon black. All of the ingredients in Control 4 were mixed using the same procedure as described in Example 1 for Control 1. Similarly, Controls 5 and 6 were prepared using the same procedures described in Example 1 for Samples 1 and 2. The rubber compositions were comprised of the ingredients illustrated in Table 7.

TABLE 7

STANDARD vs PHASE-MIXED COMPOUNDS

| Sample | Control 4 | Control 5 | Control 6 |
|---|---|---|---|
| Mix Procedure | Standard | Phase | Phase |
| Component | NP | NP A | NP A |
| BR[1] | 30 | | |
| ESBR[2] | 70 | 70 | 70 |
| Silica[3] | 30 | 30 | 30 |
| Carbon Black (N220) | 15 | | 15 |
| Carbon Black (N351) | 15 | 15 | |
| Oil | 10 | 7 | 7 |
| Wax | 1.5 | 1.05 | 1.05 |
| Stearic Acid | 2.0 | 1.4 | 1.4 |
| Coupling Agent[4] | 5.5 | 5.5 | 5.5 |
| | | NP B | NP B |
| BR[1] | | 30 | 30 |
| Carbon Black (N220) | | 15 | |
| Carbon Black (N351) | | | 15 |
| Oil | | 3 | 3 |
| Wax | | 0.45 | 0.45 |
| Stearic Acid | | 0.60 | 0.60 |
| | Productive | Productive | Productive |
| Antioxidants[5] | 3.4 | 3.4 | 3.4 |
| Zinc Oxide | 3.5 | 3.5 | 3.5 |
| Sulfur | 1.3 | 1.3 | 1.3 |
| Accelerators 1 & 2[6] | 1.6 | 1.6 | 1.6 |

TABLE 7-continued

[1]Polybutadiene rubber obtained from The Goodyear Tire & Rubber Company under the designation Budene 1207.
[2]Emulsion polymerizated SBR having a bound styrene content of about 23 percent by weight and obtainable as PLF 1502 from The Goodyear Tire & Rubber Company.
[3]ZEOPOL 8745 commercially available from Huber Company.
[4]3,3'-bis(triethoxysilylpropyl)tetrasulfide on a carbon black carrier (50%—50% by weight) commercially available from Degussa under the commercial designation X50S.
[5]Of the paraphenylene diamine types.
[6]The accelerators were of the sulfenamide and thiuram disulfide types.

The physical properties for the resulting vulcanized rubber compositions are shown in the following Table 8.

TABLE 8

| Sample Mix Procedure | Control 4 Standard Properties | Control 5 Phase | Control 6 Phase |
|---|---|---|---|
| Tensile Modulus, MPa | | | |
| 100% | 2.1 | 2.2 | 2.3 |
| 300% | 11.3 | 11.2 | 11.5 |
| Tensile Strength, MPa | 19.1 | 19.4 | 18.2 |
| Hardness, RT | 61 | 62 | 62 |
| 100° C. | 56 | 57 | 58 |
| Rebound, RT | 51 | 49 | 49 |
| 100° C. | 62 | 61 | 62 |
| Autovibron Properties @ 11 Hz | | | |
| Tan Delta, 60° C. | 0.089 | 0.070 | 0.088 |

The phase-mixed compounds (Controls 5 and 6) as well as the Control 4 of Table 8 exhibited very similar modulus, hardness, rebound and Tangent delta at 60° C. values. These data suggest that tire performance properties of the phase-mixed and standard "all-in" mixed compounds illustrated in Tables 7 and 8 would not be different. It should be noted that the compounds of Tables 7 and 8 do not contain NR.

By contrast, the compounds described in Examples 1–3, Tables 1–6, all contain NR as either the major or minor rubber blend component. When NR is present in the compound, the phase-mixed compounds provided higher modulus, hardness and rebound values than the corresponding standard "all-in" mixed control compounds of the same composition.

What is claimed is:

1. A process for the production of a heterogeneous precipitated silica/carbon black-filled rubber compound comprising (a) intimately dispersing substantially all of the precipitated silica filler and a first carbon black in a first rubber to form a silica/first carbon black-filled compound;

(b) separately and intimately dispersing a second carbon black in a second rubber to form a second carbon black-filled compound; and (c) mixing said silica/first carbon black-filled compound with said second carbon black-filled compound to form a heterogeneous silica/carbon black-filled rubber compound, wherein said first carbon black and second carbon black are different from each other and one of said first carbon black or second carbon black has a DBP absorption value in a range of from about 90 to about 160 cc/100 gm and a corresponding Iodine Number in a range of from about 90 to about 150 g/kg and the other first or second carbon black has a DBP absorption value in a range of from about 60 to about 160 cc/100 gm with a corresponding Iodine Absorption Number in a range of about 25 to about 85 g/kg; and wherein said first rubber and second are different from each other and one of said first rubber or second rubber is cis 1,4-polyisoprene and the other first or second rubber is selected from the group consisting of emulsion polymerized styrene/butadiene copolymers, solution polymerized styrene/butadiene copolymers, cis 1,4-polybutadiene, styrene/isoprene copolymers, 3,4-polyisoprene, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and mixtures thereof.

2. The process of claim 1 wherein said first rubber is selected from the group consisting of solution polymerized styrene/butadiene copolymers, isoprene/butadiene copolymers, cis 1,4-polybutadiene and mixtures thereof and said second rubber is natural rubber.

3. The process of claim 1 wherein said first rubber is natural rubber and said second rubber is selected from the group consisting of solution polymerized styrene/butadiene copolymers, isoprene/butadiene copolymers, cis 1,4-polybutadiene and mixtures thereof.

4. The process of claim 1 wherein said first carbon black has a DBP absorption value in a range of from about 60 to about 160 cc/100 gm with a corresponding Iodine Absorption Number in a range of about 25 to about 85 g/kg, and said second carbon black has a DBP absorption value in a range of about 90 to about 160 cc/100 cc/100 gm and a corresponding Iodine Number in a range of about 90 to about 150 g/kg.

5. The process of claim 1 wherein said first carbon black has a DBP absorption value in a range of from about 90 to about 160 cc/100 gm and a corresponding Iodine Absorption Number in a range of about 90 to about 150 g/kg, and said second carbon black has a DBP absorption value in a range of from about 60 to about 160 cc/100 gm and a corresponding Iodine Absorption Number in a range of about 25 to about 85 g/kg.

6. The process of claim 1 wherein a sulfur-vulcanization agent and at least one accelerator is present when said silica/first carbon black-filled compound is mixed with said second carbon black-filled compound.

7. The process of claim 1 wherein the total weight of silica, first and second carbon blacks that is added to the rubber totals from a range of from 8 phr to 160 phr.

8. The process of claim 1 wherein from 5 to 120 phr of a silica filler is intimately dispersed with said first carbon black and first rubber to form said silica/first carbon black-filled compound.

9. The process of claim 1 wherein from 1 to 90 phr of said first carbon black is intimately dispersed with said silica and first rubber to form said silica/first carbon black-filled compound.

10. The process of claim 1 wherein from 1 to 90 phr of second carbon black is intimately dispersed with said second rubber to form said second carbon black-filled compound.

11. The process of claim 1 wherein a silica coupling agent is intimately dispersed with said first rubber compound to form said silica/first carbon black-filled compound.

12. The process of claim 11 wherein said silica coupler is a sulfur-containing organosilicon material.

13. The process of claim 12 wherein said sulfur-containing organosilicon compound is of the formula:

Z—Alk—S$_n$—Alk—Z in which Z is selected from the group consisting of

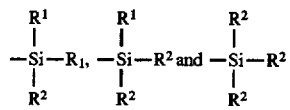

where
R$^1$ is an alkyl group of 1 to 4 carbon atoms, cyclohexyl or phenyl;
R$^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8.

14. The process of claim 11 wherein said silica filler, first carbon black, silica coupler and first rubber compound are intimately dispersed by mixing at a rubber temperature of from 130° C. to 180° C. for a period of from 10 seconds to 20 minutes.

15. The process of claim 1 wherein from 20 phr to 80 phr is the first rubber.

16. The process of claim 1 wherein from 20 phr to 80 phr is the second rubber.

17. The process of claim 1 wherein said cis 1,4-polyisoprene is natural rubber.

18. A heterogeneous precipitated silica/carbon black-filled rubber compound by a process comprising
(a) intimately dispersing substantially all of the precipitated silica filler and a first carbon black in a first rubber to form a silica/first carbon black-filled compound;
(b) separately and intimately dispersing a second carbon black in a second rubber to form a second carbon black-filled compound; and
(c) mixing said silica/first carbon black-filled compound with said second carbon black-filled compound to form a heterogeneous silica/carbon black-filled rubber compound, wherein said first carbon black and second carbon black are different from each other and one of said first carbon black or second carbon black has a DBP absorption value in a range of from about 90 to about 160 cc/100 gm and a corresponding Iodine Number in a range of from about 90 to about 150 g/kg and the other first or second carbon black has a DBP absorption value in a range of from about 60 to about 160 cc/100 gm with a corresponding Iodine Absorption Number in a range of about 25 to about 85 g/kg; and wherein said first rubber and second are different from each other and one of said first rubber or second rubber is cis 1,4-polyisoprene and the other first or second rubber is selected from the group consisting of emulsion polymerized styrene/butadiene copolymers, solution polymerized styrene/butadiene copolymers, cis 1,4-polybutadiene, styrene/isoprene copolymers, 3,4-polyisoprene, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and mixtures thereof.

19. The compound of claim 18 wherein said first rubber is selected from the group consisting of solution polymerized styrene/butadiene copolymers, isoprene/butadiene copolymers, cis 1,4-polybutadiene and mixtures thereof and said second rubber is natural rubber.

20. The compound of claim 18 wherein said first rubber is natural rubber and said second rubber is selected from the group consisting of solution polymerized styrene/butadiene copolymer, isoprene/butadiene copolymers, cis 1,4-polybutadiene and mixtures thereof.

21. The compound of claim 18 wherein said first carbon black has a DBP absorption value in a range of from about 60 to about 160 cc/100 gm with a corresponding Iodine Absorption Number in a range of about 25 to about 85 g/kg, and said second carbon black has a DBP absorption value in a range of about 90 to about 160 cc/100 cc/100 gm and a corresponding Iodine Number in a range of about 90 to about 150 g/kg.

22. The compound of claim 18 wherein said first carbon black has a DBP absorption value in a range of from about 90 to about 160 cc/100 gm and a corresponding Iodine Absorption Number in a range of about 90 to about 150 g/kg, and said second carbon black has a DBP absorption value in a range of from about 60 to about 160 cc/100 gm and a corresponding Iodine Absorption Number in a range of about 25 to about 85 g/kg.

23. The process of claim 18 wherein a sulfur-vulcanization agent and at least one accelerator is present when said silica/first carbon black-filled compound is mixed with said second carbon black-filled compound.

24. The compound of claim 18 wherein the total weight of silica, first and second carbon blacks that is added to the rubber totals from a range of from 8 phr to 160 phr.

25. The compound of claim 18 wherein from 5 to 120 phr of a silica filler is intimately dispersed with said first carbon black and first rubber to form said silica/first carbon black-filled compound.

26. The compound of claim 18 wherein from 1 to 90 phr of said first carbon black is intimately dispersed with said silica and first rubber to form said silica/first carbon black-filled compound.

27. The compound of claim 18 wherein from 1 to 90 phr of second carbon black is intimately dispersed with said second rubber to form said second carbon black-filled compound.

28. The compound of claim 18 wherein a silica coupling agent is intimately dispersed with said first rubber compound to form said silica/first carbon black-filled compound.

29. The compound of claim 28 wherein said silica coupler is a sulfur-containing organosilicon material.

30. The compound of claim 29 wherein said sulfur-containing organosilicon compound is of the formula:

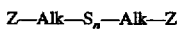

in which Z is selected from the group consisting of

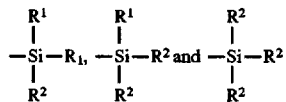

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

31. The compound of claim 28 wherein said silica filler, first carbon black, silica coupler and first rubber compound are intimately dispersed by mixing at a rubber temperature of from 130° C. to 180° C. for a period of from 10 seconds to 20 minutes.

32. The compound of claim 18 wherein from 20 phr to 80 phr is the first rubber compound.

33. The compound of claim 18 wherein from 20 phr to 80 phr is the second rubber compound.

34. The compound of claim 18 which is vulcanized at a temperature ranging from 100° C. to 200° C.

35. The compound of claim 34 which is in the form selected from the group consisting of a pneumatic tire, belt, hose, air spring, shoe product and motor mount.

36. A pneumatic tire having a tread comprised of the composition of claim 34.

37. The process of claim 2 wherein said first rubber is cis 1,4-polybutadiene and said second robber is natural robber.

38. The process of claim 3 wherein said first rubber is natural rubber and said second rubber is cis 1,4-polybutadiene.

39. The compound of claim 19 wherein said first rubber is cis 1,4-polybutadiene and said second rubber is natural rubber.

40. The compound of claim 20 wherein said first rubber is natural rubber and said second rubber is cis 1,4-polybutadiene.

41. The compound of claim 39 which is vulcanized at a temperature ranging from 100° C. to 200° C.

42. The compound of claim 40 which is vulcanized at a temperature ranging from 100° C. to 200° C.

43. A pneumatic tire having a tread comprised of the composition of claim 41.

44. A pneumatic tire having a tread comprised of the composition of claim 42.

* * * * *